May 19, 1964 C. E. BRANICK 3,133,317
CURING AND TESTING RIM FOR PNEUMATIC TIRE CASINGS
Filed Oct. 12, 1961
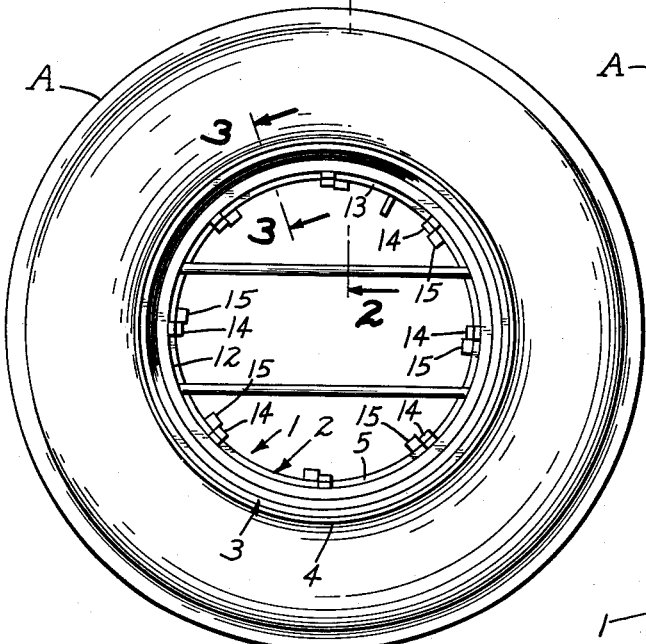
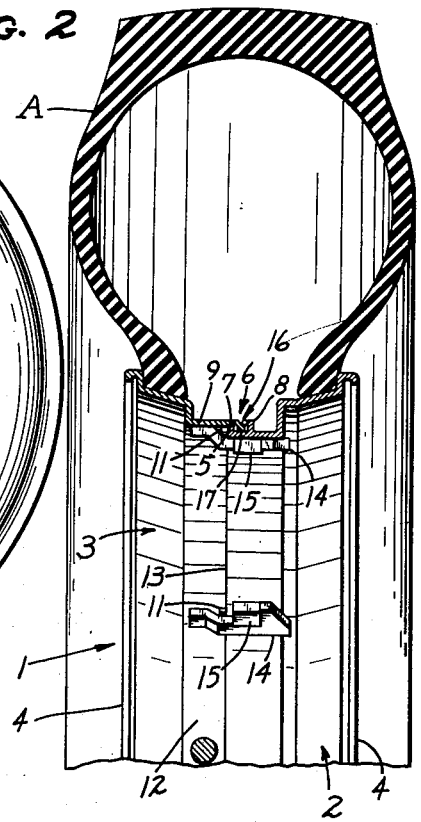
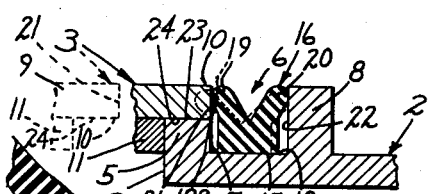
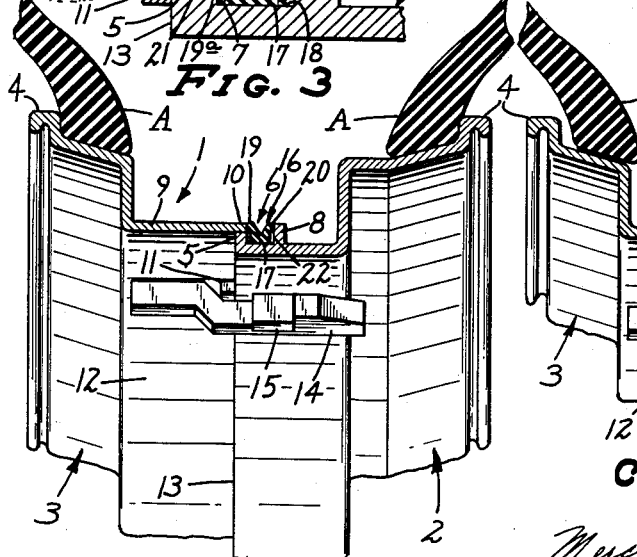
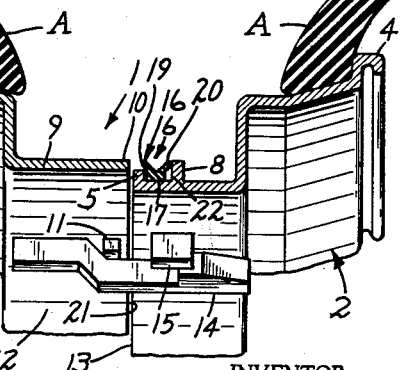
INVENTOR.
CHARLES E. BRANICK
BY
Merchant, Merchant & Gould
ATTORNEYS

United States Patent Office 3,133,317
Patented May 19, 1964

3,133,317
CURING AND TESTING RIM FOR PNEUMATIC
TIRE CASINGS
Charles E. Branick, % Branick Manufacturing Co.,
Box 1937, Fargo, N. Dak.
Filed Oct. 12, 1961, Ser. No. 144,716
1 Claim. (Cl. 18—45)

My invention relates to rim structures for tubeless pneumatic tire casings and are of the type particularly utilizable during a retread curing operation and/or testing of said casings for leaks.

More specifically, my invention is in the nature of an improvement upon my Patent No. 2,871,518 directed to this general subject matter; and even more specifically it provides a novel arrangement of parts together with a novel sealing element whereby the cooperating rim sections may be effectively sealed during the assembling of said rim sections into their operative positions.

A primary object of my invention is the provision of a novel combination curing and testing rim for tubeless pneumatic tires which is relatively inexpensive to construct, which is relatively light in weight, and which has a minimum of working parts.

A further object of my invention is the provision of a device of the class above described which is extremely easy to manipulate, is completely foolproof in its operation, and rugged and durable in construction.

The above and still further objects of my invention will become apparent from the following detailed specification, appended claims and attached drawings.

Referring to the drawings wherein like characters indicate like parts throughout the several views.

FIG. 1 is a view in side elevation of my novel rim mounted upon a pneumatic tire casing;

FIG. 2 is an enlarged sectional view taken on the line 2—2 of FIG. 1;

FIG. 3 is an enlarged fragmentary view in section taken substantially on the line 3—3 of FIG. 1;

FIG. 4 is a view corresponding generally to FIG. 3 but showing a different position of some of the parts thereof; and FIG. 5 is a greatly enlarged detail view corresponding to a portion of FIG. 3.

Referring with greater particularity to the drawings, the numeral 1 indicates in its entirety my novel rim comprising a pair of annular sections 2, 3, each thereof having a generally radially outwardly projecting circumferentially extended tire bead engaging flange 4 at its outer edge. Whereas rim 1 is shown as being of the drop center type, I wish to emphasize here that may invention is equally applicable to section type rims of other shapes and designs.

As shown, the rim section 2 is formed adjacent its inner edge 5 to define a radially outwardly opening generally cross-sectionally U-shaped channel 6, the inner wall 7 of which is of less radial dimension than the outer wall 8 thereof.

Rim section 3 has a cylindrical portion 9 the extreme inner edge 10 of which is telescopically receivable over the extreme inner edge 5 of the rim section 2. A plurality of circumferentially spaced stop lugs 11, welded or otherwise rigidly secured to the radially inner surface 12 of the cylindrical portion 9, limit telescoping movements of the rim sections 2, 3 by engagement with the inner side edge 13 of the rim section 2, when said sections 2, 3 are in their operative position of FIG. 3. Cooperating locking hooks 14 and locking lugs or blocks 15, the former carried by rim section 3 and the latter by rim section 2, cooperate to retain the rim sections 2, 3 in said operative relationship when limited rotary movement is imparted to one of said sections with respect to the other.

Seated within the channel 6 is an elastic endless sealing element 16 the base portion 17 of which is snugly seated upon the bottom wall 18 of the channel 6. An extremely important feature of my invention resides in the forming of the sealing ring element 16 in a manner to provide a pair of radially and axially outwardly flaring sealing flanges 19, 20 which, as shown in FIG. 4, are normally spaced apart a distance greater than the spacing between the side walls 7, 8 of the channel 6, whereby as shown in FIG. 4, one of said sealing flanges 19 projects axially outwardly of the channel 6 in upwardly spaced relation to the relatively short inner wall 7 thereof. Consequently, as the rim sections 2, 3 are brought into the operative position of FIG. 3, the supplementary channel wall forming side edge 21 of the rim section 3 engages the upper end portion 19a of sealing flange 19 and moves same under yielding bias in the direction of the flange 20, whereby to cause initial sealing engagement to be affected between the flange 19 and the supplementary channel wall forming edge 21 of the rim section 3, and between flange 20 and the wall surface 22 of the relatively taller side wall 8 associated with the rim section 2. It is important to note that the point of engagement of the sealing flange 19 with the supplementary side wall forming surface 21 of the rim section 3, is above the loosely telescoping surfaces 23, 24 of the rim sections 2, 3 respectively. Additional air pressure inserted into a tire A will progressively increase the sealing effect of the sealing flanges 19, 20 upon the opposite walls of the channel 6.

Also of importance, as shown in FIGS. 2, 3 and 4, is that the base 17 of the sealing element 16 at the point of convergence of the flaring sealing elements 19, 20, is of less width than the channel 6 in which it is received, thus assuring relative freedom of flaring movement of the sealing element 19 when the rim sections 2, 3 are separated. The fact that the base 17 of sealing element 16 is in snug engagement with the bottom wall 18 of the channel 6 of course assures that the sealing element 16 will be retained within said channel, even when said rim sections 2, 3, are in said separated positions.

My invention has been thoroughly tested and found to be completely satisfactory for the accomplishment of the above objects, and while I have shown a preferred embodiment thereof, I wish it to be understood that same may be capable of modification without departure from the scope and spirit of the appended claim.

What I claim is:
In a two-part circumferentially divided curing and pressure testing rim for mounting a tubeless tire thereon with one part of said rim having a circumferentially outwardly channeled inner edge portion, said channel providing at the inner edge of said one part a radial inner side wall and a laterally spaced outer wall of greater radial dimension than said inner side wall, and the other part of said rim having a cylindrical inner edge portion telescopically receivable on said channel inner side wall; the improvement comprising an endless elastic sealing ring seated on the base of said channel in laterally spaced re- lation to the radial side walls thereof, and said sealing ring having a pair of radially and axially outwardly flaring sealing flanges, one of said flanges being in normal sealing engagement with said outer wall of greater radial dimension and the other flange normally projecting axially outside of said channel to overlie said inner radial wall thereof, whereby to be enegaged by said telescoping cylindrical inner edge portion of one rim part and compressed into the confines of said channel of the other rim part against the yielding bias of said flanges of said sealing ring.

References Cited in the file of this patent

UNITED STATES PATENTS

| | | |
|---|---|---|
| 2,516,191 | Englesson | July 25, 1950 |
| 2,871,518 | Branick | Feb. 3, 1959 |